United States Patent [19]

Trotman et al.

[11] 4,205,880

[45] Jun. 3, 1980

[54] BODY SUPPORTING AND SPACING STRUCTURE

[76] Inventors: Helen H. Trotman; Herbert H. Trotman, both of P.O. Box 807, Virginia Beach, Va. 23451

[21] Appl. No.: 16,401

[22] Filed: Mar. 1, 1979

Related U.S. Application Data

[63] Continuation-in-part of Ser. No. 909,761, May 26, 1978, abandoned, which is a continuation of Ser. No. 783,263, Mar. 31, 1977, abandoned.

[51] Int. Cl.$^2$ .............................................. A47C 7/02
[52] U.S. Cl. ........................................ 297/453; 5/468
[58] Field of Search .................. 5/468, 481; 108/51.1; 297/453, DIG. 2

[56] References Cited

U.S. PATENT DOCUMENTS

| | | | |
|---|---|---|---|
| 24,302 | 6/1859 | Aenley ..................................... | 5/468 |
| 3,197,357 | 7/1965 | Schulpen ............................. | 5/481 X |
| 3,258,791 | 7/1966 | Kaplan ................................ | 5/481 |
| 3,940,183 | 2/1976 | Seltzer et al. ....................... | 297/453 |

Primary Examiner—James C. Mitchell
Attorney, Agent, or Firm—Shanley, O'Neil and Baker

[57] ABSTRACT

A body support member for spacing a body above a supporting structure which comprises a sheet of resilient plastic material permanently deformed to produce downwardly disposed, laterally spaced, elongated protuberances distributed over a body support area for engaging the supporting surface, adjacent elongated protuberances being complementary in shape with each one having a plurality of reversed direction portions along its length, the reversed direction portions in adjacent protuberances being in overlapping relation in the plane of the body support area looking in the direction the elongated protuberances extend, whereby the body support area of the member will resist flexing along all lines traversing the body support area. Where desired, the resiliency of the plastic material of the body support member can be such that the reversed direction portions of the elongated protuberances incorporate an inherent spring-like action under the weight of a supported body to cushion the same. Ornamental cover material may be applied over the top and/or bottom of the body support member. The body support member is so designed that it can be vacuum or pressure molded and is therefore stackable in large numbers for shipment and storage. The body support member may have joined to the lower portions of the elongated protuberances a second sheet of plastic material which is flat or a second sheet of plastic material which has upwardly disposed elongated protuberances which can be complementary in shape to the elongated protuberances of the body support member joined to the lower portions of the downwardly disposed elongated protuberances of the body support member.

20 Claims, 15 Drawing Figures

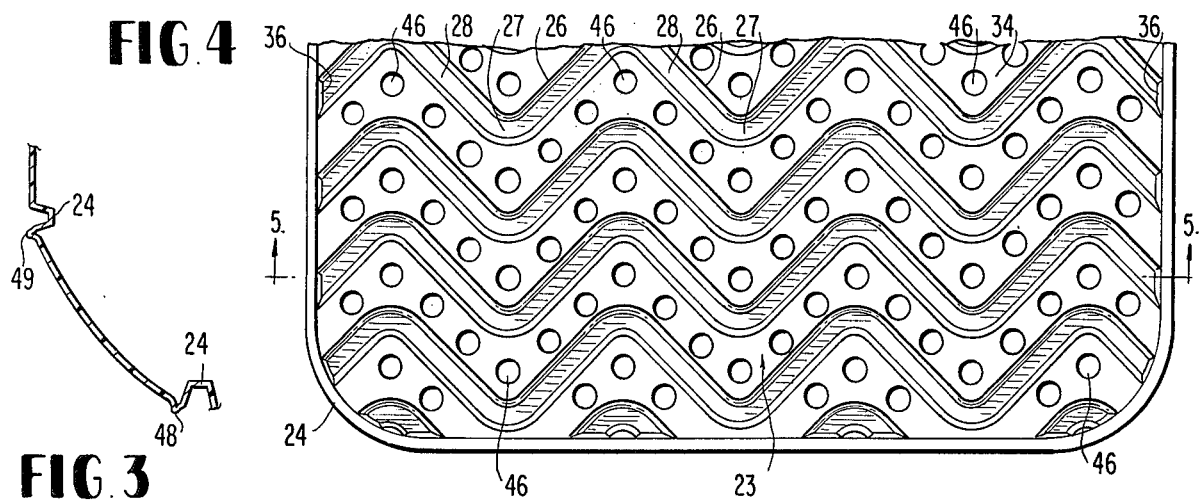
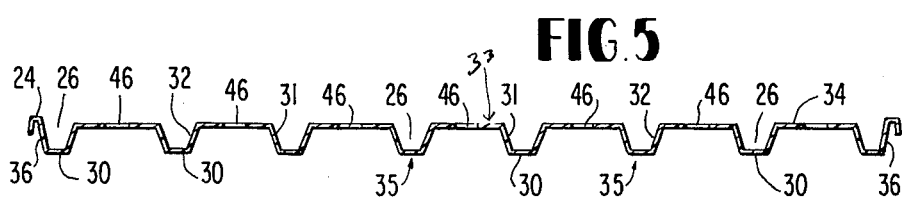
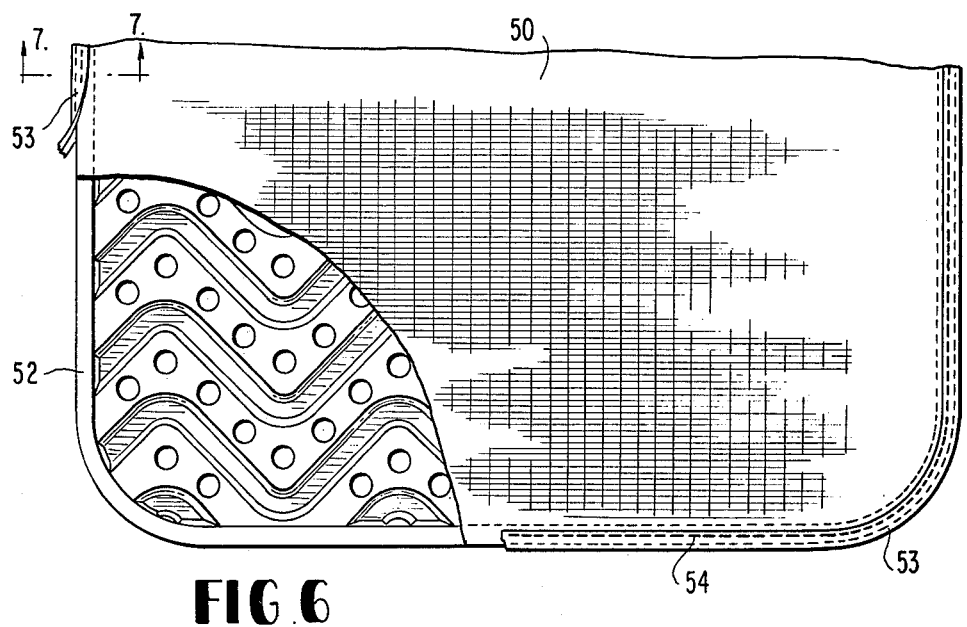
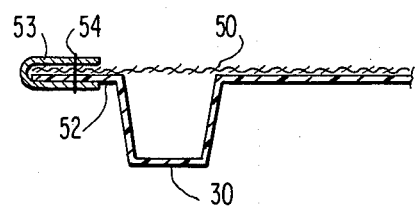
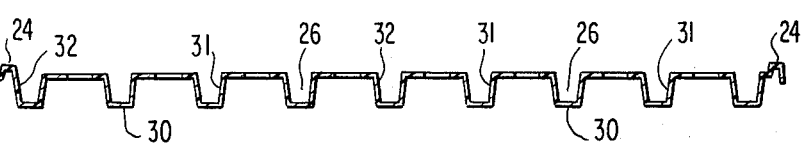

BODY SUPPORTING AND SPACING STRUCTURE

RELATED APPLICATIONS

This application is a continuation in part of application Ser. No. 909,761, filed May 26, 1978 now abandoned which in turn was a continuation of application Ser. No. 783,263 filed Mar. 31, 1977 now abandoned.

BACKGROUND OF THE INVENTION

For some time, it has been desirable to have available for various uses, including in ventilated seats and in industrial pallets, an economical single sheet member formed from resilient plastic which will support a body in spaced relation to a supporting structure, where the member is formed from a single sheet of plastic which is permanently deformed to produce spacing elements or protuberances which not only will space the upper surface of the member above the supporting structure but will resiliently rigidify the overall member to prevent excessive flexing or any undesirable amount of flexing in use.

In U.S. Pat. Nos. 3,162,487 and 3,162,488 of H. H. Trotman, a single sheet of plastic is deformed to produce spacing elements of protuberances in a ventilated seat cushion. In these patents, however, the sheet of plastic, although adequately performing the spacing function as part of the seat construction, requires additional stiffening members in order to assure that the seat will retain its shape.

U.S. Pat. No. 2,948,334 of Goldstein is another example of a prior art attempt to produce a ventilated seat cushion from a sheet of plastic where the product lacks the necessary combination of rigidity and resilience for a successful product.

In U.S. Pat. No. 3,940,183, a support panel for use as a ventilated body support mat is disclosed having a plurality of integral T-shaped elements arrayed in columns and rows in an attempt to attain the desired combination of rigidity and resilience. Here again the desideratum is not attained as is evidenced by the provision of supplemental stiffening means.

In the past, industrial pallets have been designed to be picked up by fork trucks thereby requiring relatively complex supporting structures. More recently the concept of a pallet which can be skidded onto a fork truck has been introduced. The body support member of the present invention constitutes an ideal structure for the latter method of handling palletized loads.

By an ingenious interrelationship of elongated protuberances formed by permanent deformation of a sheet of plastic material, the present invention supplies the deficiencies of the prior art. By using a sheet of plastic material which, when shaped in accordance with the present invention is resilient in the realm of the forces exerted by the weight of a human body, the formed sheet of plastic material of the present invention can be used as a member which is rigid enough to retain its shape while at the same time exhibiting a springy characteristic so as to act as a cushion between a human body and a supporting structure. This is especially the case where the sheet of plastic material is superposed on a cushion such as an automobile seat cushion to achieve ventilation between the person supported on the sheet of plastic material and the automobile seat. On the other hand, the body support member of the present invention can perform the functions of an industrial pallet where no cushioning action is desired but rather the desideratum is a flat supporting surface of sufficient rigidity to act as a skiddable base for a stack of industrial products, this being attained by utilizing a heavier gage of plastic sheet material with greater rigidity and strength.

Although from the foregoing and as description of the present invention proceeds, it will be apparent that the body support member of the present invention is applicable to fields other than seat cushions, the invention will be described in the seat cushion environment where the resilience of the thin sheet of plastic material, taken in conjunction with the configuration of the sheet, can be utilized to great advantage.

SUMMARY OF THE INVENTION

A supporting spacing member for use between a supporting surface and a body to be supported comprising a sheet of resilient plastic material having an upper surface and a lower surface, a body support area provided by the sheet of plastic material, a plurality of spaced elongated protuberances permanently formed in the sheet of plastic material throughout the body support area and extending downwardly from the upper surface, the elongated protuberances being open at the top and having side walls and bottom walls, the plurality of elongated protuberances being disposed in spaced adjacent relation to one another and extending longitudinally continuously along paths which extend across an entire dimension of the body support area, portions of the sheet of plastic material which extend between the open tops of spaced adjacent elongated protuberances coacting to form in the aggregate a generally flat body engaging structure, the lowermost surfaces of the bottom walls of protuberances coacting to form in the aggregate a generally flat support structure for engaging the supporting surface, each of the plurality of elongated protuberances incorporating along its longitudinal dimension a plurality of curved direction changing portions and a plurality of portions connecting the curved direction changing portions, successive curved direction changing portions of elongated protuberances alternating in the direction of change along the paths across the body support area, alternate curved direction changing portions of spaced adjacent elongated protuberances along the paths across the body support area being in overlapping relation to each other looking in the direction the paths extend, the disposition of elongated protuberances in paths across an entire dimension of the body support area and the overlapping relationship of the alternate curved direction changing portions resulting in a body support area in which all planes normal to the generally flat body engaging structure will successively intersect a plurality of elongated protuberances at a plurality of spaced points across an entire dimension of the body support area or will repeatedly intersect alternately disposed portions connecting curved direction changing portions of a single elongated protuberance at a plurality of spaced points across an entire dimension of the body support area.

BRIEF DESCRIPTION OF THE DRAWINGS

FIG. 2 is a view in vertical section taken on the line 2—2 of FIG. 1;

FIG. 3 is an enlarged fragmentary view of a detail of FIG. 2;

FIG. 4 is an enlarged fragmentary view in plan of a portion of the seat of FIG. 1;

FIG. 5 is a view in cross-section taken on the line 5—5 of FIG. 4;

FIG. 6 is an enlarged fragmentary view in plan similar to FIG. 4 of a modified embodiment of the present invention;

FIG. 7 is a still further enlarged fragmentary view in section taken on the line 7—7 of FIG. 6;

DESCRIPTION OF THE PREFERRED EMBODIMENTS

Figure 1:
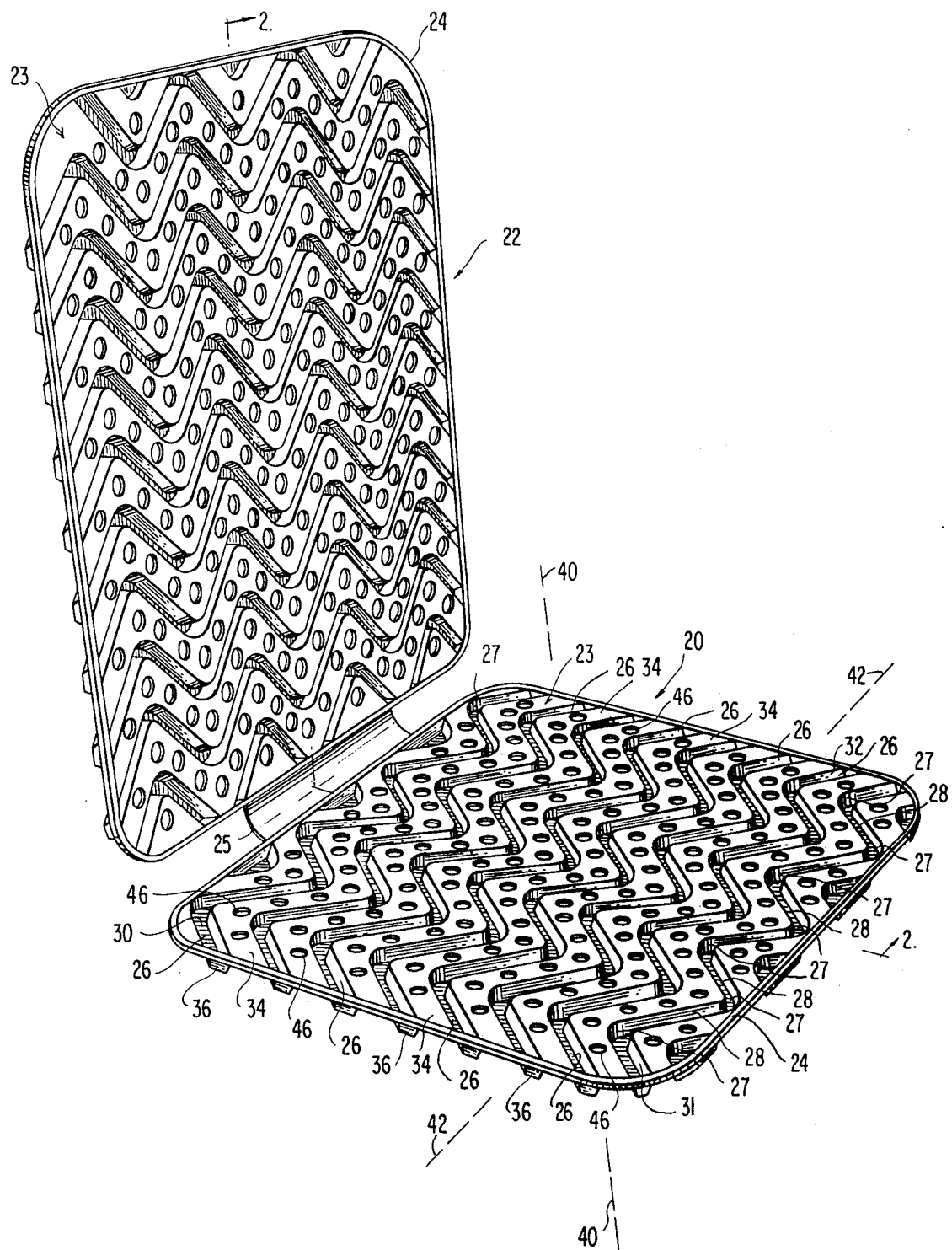
FIG. 1 is a perspective view of a preferred embodiment of the present invention in the form of a seat cushion especially suitable for use in an automobile where a ventilated seat is desired.

As already mentioned, the principles and advantages of the present invention will be described in the environment of a car seat and a preferred form of the same is shown in FIGS. 1 to 5. The member shown in these figures can be a component of a car seat cushion, as will be evident as this description proceeds, or the member alone can be the entire car seat cushion.

The car seat cushion illustrated is made up of a seat member indicated generally by the reference numeral 20 and a back member indicated generally by the reference numeral 22, each member having an ornamental bead or marginal portion 24 circumscribing a body support area indicated generally at 23, 23. Normally the seat member and the back member will be formed integrally from the same material, namely, a thin sheet of resilient plastic which can be heat formed in a vacuum or pressure mold to give a desired permanent, three dimensional configuration to the sheet. An integral hinge section 25 joins the seat and back portions.

Since the body support areas 23, 23 can have the same configuration in the seat member and the back member and are so shown in FIG. 1, specific reference is made at this point only to the seat member.

In the presently preferred embodiment of the present invention, a plurality of elongated protuberances 26 are formed in a flat sheet of plastic material in a vacuum mold in the inverse position of seat member 20 as shown in FIG. 1 so that as the sheet is formed in the mold, the protuberances are directed upwardly. However, for convenience in describing the present invention and without limitation in respect to what is top and what is bottom in the various modifications shown, described and covered by the appended claims, the surface of the seat member which appears uppermost in FIGS. 1, 2, 4 and 5 will be termed the top surface of the sheet and the opposite side of the sheet will be termed the bottom surface. Thus, in the seat member of these figures, the elongated protuberances 26 depend downwardly and are open upwardly.

In view of the nature of the plastic sheet and the method of manufacture of the seat and back member it will be seen that the car seat cushion and its components are nestable and therefore stackable for storage and shipment. This constitutes a tremendous commercial advantage.

In the embodiment of FIGS. 1-5, these elongated protuberances 26 extend continuously across an entire dimension of the body support area from marginal portion 24 on one side of the seat member to marginal portion 24 on the other side of the seat member, periodically changing direction along their length. Inspection of FIG. 1 shows that in this presently preferred embodiment the plurality of elongated protuberances 26, although incorporating curved direction changing portions 27 and portions 28 connecting the direction changing portions 27, nevertheless extend side by side in generally parallel paths between the opposite marginal portions 24 of the seat member. Of course, the general direction of the parallel paths of elongated protuberances 26 could be across other dimensions of the body support area, such as from the front of the seat to the back or diagonally of the seat member without departing from the principles of the invention.

Each elongated protuberance 26 has a bottom wall 30 and sidewalls 31, 32. The upper surface of the sheet of plastic material forming the seat member is formed in contact with the surfaces of the mold as the hot plastic is drawn or forced down into depressions in the mold and this bottom surface in the mold becomes the upper surface in the finished seat member. The surface portions 34 of this top surface of the sheet of plastic material made up of the portions of the sheet which extend between the open tops of protuberances 26 constitute in the aggregate a body engaging structure 33 of the seat and preferably, but not necessarily, this structure is flat to form a comfortable surface for contact with the body of the person using the seat. It is also preferable for comfort in respect to the body engaging structure that the area of plastic sheet between the open tops of the protuberances be as large as possible, consistent with requisite strength in the elongated protuberances and therefore the area of the body engaging structure 33 can, as shown, constitute more than one-half the area of the body support area, which latter area of course includes the open tops of the elongated protuberances. On the other hand at the sacrifice of some comfort aspects, the aggregate area of surfaces 34 may be less than one-half the body support area 23. Of course, surfaces 34 can vary in size and shape in the same body support area 23.

Where desired, due to the nature of the plastic and the fact that it has some memory, the body engaging structure 33 of the seat member can be slightly contoured, concavely upwardly, thereby enhancing the seat-like appearance. The bottom walls 30 of the elongated protuberances are shown flat but can be rounded and in either case the lowermost portions of elongated protuberances 26 can be coplanar and coact in the aggregate to present an overall, generally flat bottom support structure 35 for the member or, if desired, can be slightly contoured as the body engaging structure 33. Where desired, the construction of the die can be such as to have the elongated protuberances gradually increase in depth toward their longitudinal end portions, while their bottom surfaces remain coplanar to give the body engaging structure 33 more contour. Since the departure from a flat structure in respect to body engaging structure 33 of the top of the sheet and corresponding departures from a flat condition in the overall shape of the bottom support structure 35 presented by the bottom walls 30 of the protuberances are not great in any case, the term "generally flat" has been adopted in this specification and in the appended claims to embrace both flat configurations and slight departures from flat configuration for the body engaging structure 33 and the bottom support structure 35.

For example, surface portions 34 can have some curvature in going from one open elongated protuberance top to the next while to a person seated on the member the structure 35 supporting the person is for support purposes generally flat.

Each elongated protuberance 26 terminates at its ends in a slightly slanting endwall 36 integrally joined to the sidewalls 31, 32 and bottom wall 30 of the elongated protuberance and preferably to the sheet portion entering marginal portion 24. This construction rigidifies the elongated protuberances at their ends.

Figure 15:
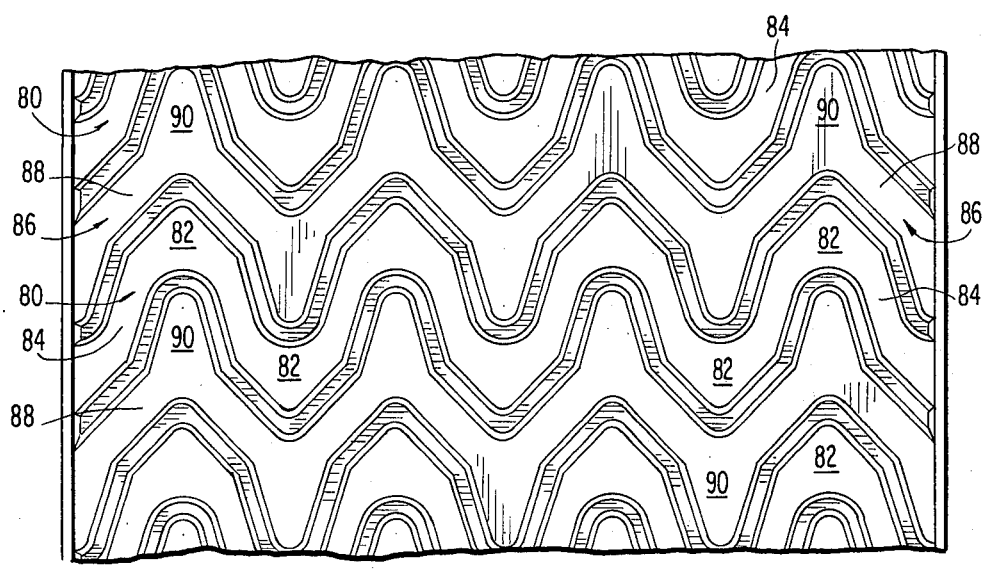
FIG. 15 is a diagrammatic view of another form of elongated protuberances which can be substituted for some or all of the shown in FIGS. 1 to 11.

It will be evident from an inspection of the preferred form of seat member 20 that the direction changing portions 27 and portions 28 connecting the direction changing portions 27 of adjacent or side by side elongated protuberances generally follow each other along the parallel paths of the protuberances across the seat so as to result in the opposed sides of side by side elongated protuberances being complementary in shape or generally complementary in shape in the plane of body support area 33 and the term complementary as used in this specification and appended claims is intended to embrace a complementary relationship in respect to only the opposed sides of protuberances (see FIG. 15, to be described, for a different form of complementary relationship).

It will further be evident that the seat member 20 of the embodiment of FIGS. 1 to 5 and the other modifications can be used along with or without the back member 22, as a seat cushion in any environment, such as on a stadium bench, on the ground in a picnic, beside a swimming pool or in any other environment where the spacing and cushioning effect are desired.

The elongated protuberances 26 with their open tops have a ventilating function because air movement occurs along their length dimension; however, where a greater ventilating action in the seat is desirable, a plurality of ventilating holes 46 are punched through the sheet, preferably in the flat body engaging structure 33, i.e., in the sheet surface portions 34 between the open tops of the elongated protuberances. Ventilating holes can be punched in other places where desired so long as the structural characteristics of the elongated protuberances is not lessened.

The integral hinge 25 preferably has a weakened bend line or "strike" 48 formed across its width adjacent ornamental bead 24 of the seat member so that the hinge will tend to bend readily along this line. Alternatively, bend line 49 can be formed across hinge 25 near the back member 22. Both such bend lines can be used or one or more bend lines anywhere in between. The width of the hinge from side to side is not appreciably greater than the width of the seat member 20 or the back member 22. This is important in that it allows the seat and back members to curve or flex slightly across their width dimension without causing an objectionable flexure in the hinge at right angles to the hinging action.

FIGS. 6 and 7 show a modification of the present invention in which the body engaging structure of a seat member and/or a back member is covered by an ornamental cover material, which may be reticulated or porous, e.g. a textile, where ventilation is a factor and/or may be padded where superficial cushioning is desired. Referring more specifically to FIGS. 6 and 7, a sheet of cover material 50 is shown on a seat member which can be similar in all respects to the seat member 20 of FIGS. 1 to 5 except that ornamental bead 24 had been omitted. As shown in these figures, instead of the ornamental bead, a marginal portion in the form of a flange 52 can surround the body support area 23. The sheet of cover material 50 can then be connected to flange 52 of the seat component by a welting 53 and stitching 54 or where preferred can be attached by an adhesive at flange 52 or at other surfaces of the seat where sheet 50 is adhered in any desired manner to surface portions 34, wear on the cover material by scrubbing action against the support member is eliminated.

Figure 8:
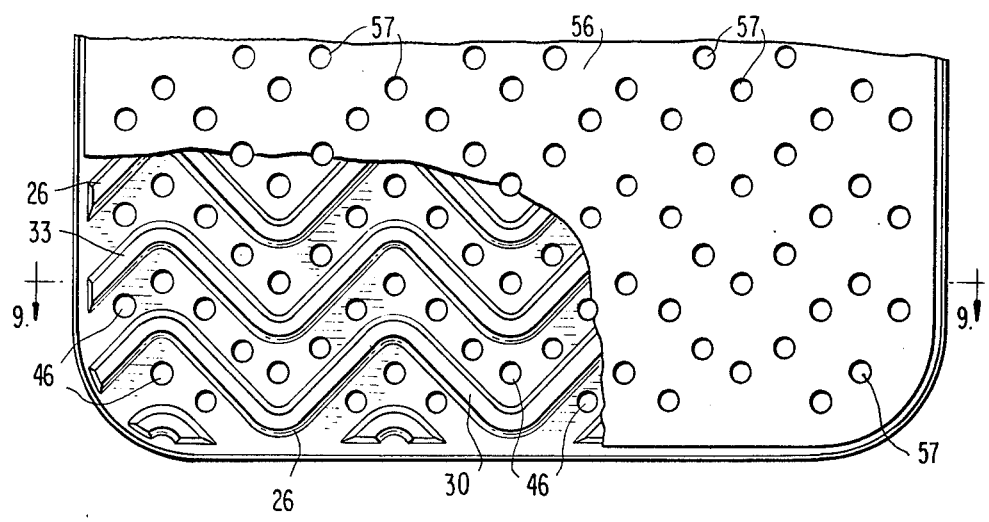
FIG. 8 is a view similar to FIGS. 4 and 6 but inverted of a still further modification of the present invention.
Figure 9:
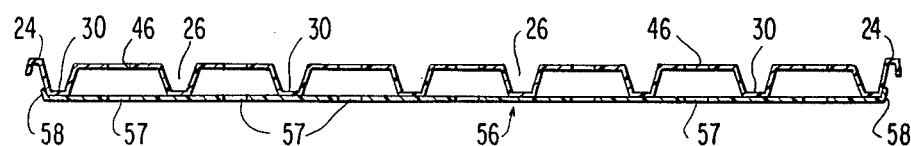
FIG. 9 is a view in cross-section taken on the line 9—9 of FIG. 8.

The modification of FIGS. 8 and 9 again illustrate a member similar to seat member 20 and/or back member 22 of FIGS. 1 to 5, but in this case the lowermost surfaces of bottom walls 30 of elongated protuberances 26 coincide with and are all or in part attached, as for example by heat fusion, to a second sheet of resilient plastic material 56. Ventilating holes 57 can be punched through sheet 56 for ventilating purposes. Where desired, sheet 56 can have an ornamental upwardly turned flange 58 for connection to end-walls 36 of protuberances 26. In this embodiment, if desired, the seat can be inverted and sheet 56 can present the body support surface and can accordingly be ornamented for aesthetic purposes or covered with a cover material 50.

Figure 10:
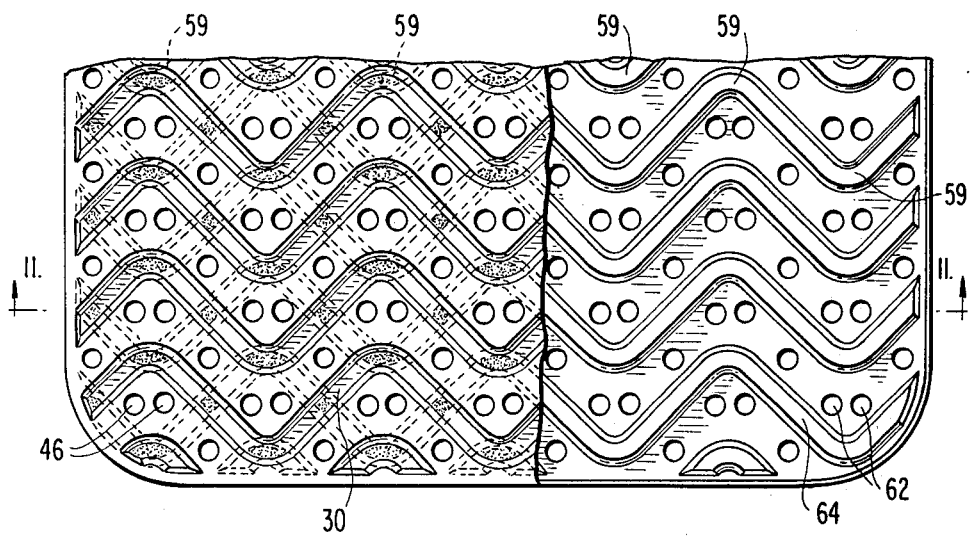
FIG. 10 is a view in plan with portions removed similar to FIG. 4, of a still further modification of the present invention.
Figure 11:
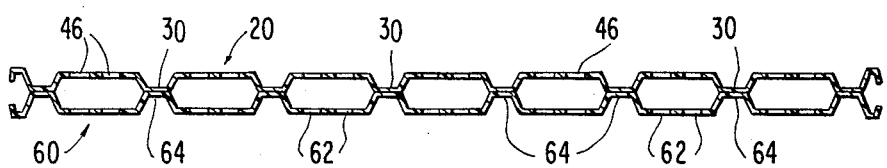
FIG. 11 is a view in cross-section taken on the line 11—11 of FIG. 10.

The modification of FIGS. 10 and 11 relates to a form of member in which two components corresponding to seat member 20 and/or back member 22 of FIG. 1 are juxtaposed with the elongated protuberances 26 making contact at spaced points, for example, at the direction changing portions 27 and portions 28 between the direction changing portions with corresponding portions 59 of elongated protuberances 64 of a similar component 60. The portions of elongated protuberances 26 which contact elongated protuberances 64 of the lower component 60 are the lowermost portions of the bottom walls 30 of elongated protuberances 26. On the other hand, it is the uppermost surfaces of the top walls of inverted elongated protuberances 64 of component 60 which do the contacting. The interrelationship of these parts is illustrated in FIG. 10 by the omission of a portion of the top component on the left hand side of the figure and showing the omitted elongated protuberances 26 in phantom and where they would contact elongated protuberances 64 of lower component 60. The contacting surfaces are connected together in any suitable manner, such as by heat fusion. As in the previously described modifications, ventilating holes 62 can be punched in component 60 similar to ventilating holes 46 of components 20 and 22.

Where desired, the position of component 60 of the modification illustrated in FIGS. 10 and 11 can be reversed relative to member 20 and/or 22 so that the bottom walls 30 of the elongated protuberances 26 match up with and coincide with the top surfaces of elongated protuberances 64 of component 60 along the full lengths of both elongated protuberances 26 and 64. Again, component 60 can be connected in similar manner to sheet 56 of the FIGS. 8 and 9 modification, with the tops of elongated protuberances 64 attached to sheet 56.

Figure 12:
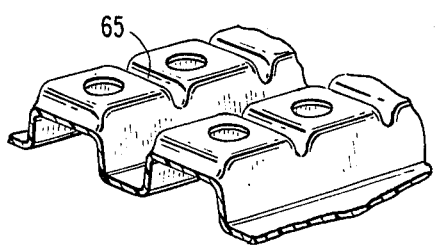
FIG. 12 is an enlarged fragmentary view of optional reinforcing struts suitable for use in the embodiments of FIGS. 1 to 11.

FIG. 12 shows an example of reinforcing struts 63 which can be used where desired between elongated protuberances 26.

Figure 13:
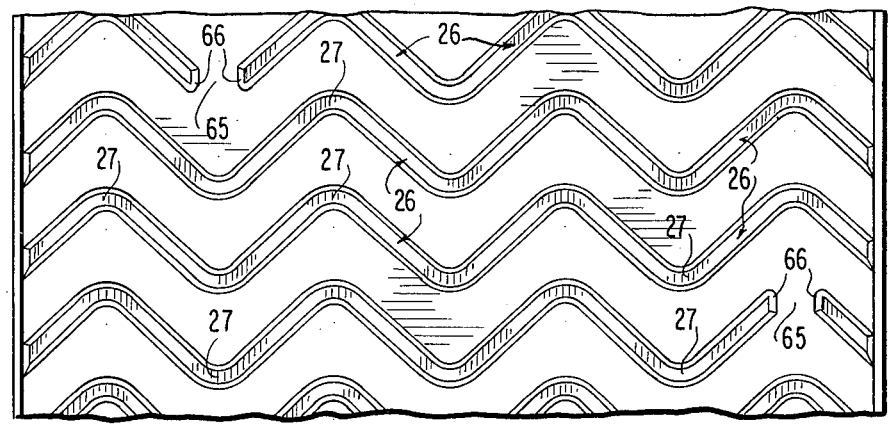
FIG. 13 is a diagrammatic view of a' pattern of elongated protuberances which can be substituted for that of FIGS. 1 to 11.

The purpose of FIG. 13 is to illustrate the fact that an occasional elongated protuberance of a component such as component 20 can have the continuity along its length periodically terminated so long as such periodically terminated protuberances are in the minority and each is contiguous to a continuous protuberance so that there is a small loss of sheet stiffening and spring action. In this modification, instead of all the elongated protuberances 26 being continuous from margin to margin of the body support area, an occasional elongated protuberance is made discontinuous by being severed or discontinued at some point or points 65 along its length such as where in contiguous protuberances there is a direction changing portion. At the severance points, the severed elongated protuberances terminate at slightly slanting walls 66 similar to walls 36 closing each end of elongated protuberances 26. In the illustrated embodiment, the severance points 65 in nearest adjacent discontinuous elongated protuberances are disposed in location so that a severance point 65 in one discontinuous elongated protuberances 26 is spaced longitudinally from a severance point 65 in the nearest adjacent discontinuous elongated protuberance. It will be noted that preferably the discontinuous elongated protuberances 26 retain several consecutive direction changing portions 27 between severance points 65 to contribute to sheet stiffening effects and spring action.

FIG. 13 illustrates the fact that all elongated protuberances need not extend entirely across the body support area to attain the advantages of the present invention. Rather, a pattern in which occasional discontinuities in elongated protuberances, which discontinuous elongated protuberances are separated from one another by one or more contiguous continuous elongated protuberances has no substantial adverse effect on the overall sheet stiffening effects and spring action of the body support area. Therefore, in the claims where terminology such as "a plurality of the elongated protuberances . . . extending longitudinally continuously along paths which extend across an entire dimension of the body support area" occurs the existence of occasional discontinuous elongated protuberances between continuously extending elongated protuberances is not ruled out.

Figure 14:
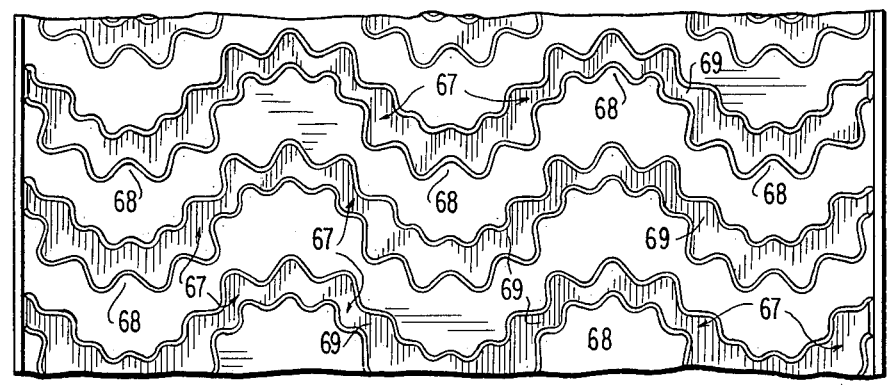
FIG. 14 is a diagrammatic view of another form of elongated protuberances which can be substituted for some or all of those shown in FIGS. 1 to 11.

The modification of FIG. 14 falls in the category where the elongated protuberances 67 in this modification have a sinuous configuration in the portions 68 extending between the direction changing portions 69 to thereby strengthen the sidewalls of the elongated protuberances. This modification although more difficult to form can be made from a plastic sheet as much as ten percent lighter in gauge.

The modification of FIG. 15 discloses elongated protuberances with two types of direction changing portions and two types of portions extending between the direction changing portions, the configurations of the protuberances in this modification being such that the degree of change in direction at alternate succeeding direction changing portions along the length of a protuberance varies in alternating manner. Therefore, pairs of side by side protuberances are complementary in shape and the direction changing portions are overlapping looking in the direction of the length of the protuberances. Applicant's advantages are therefore achieved with this modification.

Referring in more detail to FIG. 15, it will be seen that adjacent elongated protuberances are dissimilar in shape and alternate elongated protuberances are the same shape and each elongated protuberance is symmetrical in respect to a straight line extending along the length of the elongated protuberance equidistant from the direction changing portions. However, the elongated protuberances are so shaped that not only can two of them be paired together with opposed sides complementary but the outer sides of this pair of juxtaposed elongated protuberances will fit in complementary relationship with the outer sides of adjacent pairs on each side of the first pair of juxtaposed elongated protuberances. At the same time, the complementary portions of all the elongated protuberances have overlapping relationship, looking in the direction of the length of the elongated protuberances.

In FIG. 15, each elongated protuberance indicated generally at 80 has less sharply sloping direction changing portions 82 along its intermediate portion and more sharply sloping direction changing portions 84 along its extremities. Juxtaposed elongated protuberance indicated generally at 86 arranged in side by side relationship to elongated protuberance 80 completes one of the pairs just referred to and it will be observed that the opposed sides of the side by side elongated protuberance 80 and 86 are complementary in shape with elongated protuberance 86 having less sharply sloping direction changing portions 88 and more sharply sloping direction changing portions 90, the opposed sides of the more sharply sloping direction changing portions and the less sharply sloping direction changing portions being complementary and the outer sides of the less sharply angled direction changing portions of adjacent pairs of elongated protuberances being complementary. The desired overlapping relationship of the elongated protuberances 80 and 86, forming one pair of elongated protuberances, with adjacent elongated protuberances of adjacent pairs is achieved by virtue of the fact that the less sharply sloping direction changing portions 82 and 88 do have sufficient projection so as to overlap with each other. With these different direction changing sloping characteristics but nevertheless overlapping relationship of direction changing portions, applicants' desideratum of combined resilience and rigidity, together with inherent spring action, are attained.

The protuberance arrangement of FIG. 15 may be considered more aesthetic than those of the earlier described forms and it will be apparent that other aesthetic forms of protuberances incorporating the principles of applicants' invention can be arrived at in similar manner.

Although the elongated protuberances 26 are shown in all modifications except that of FIG. 15 as being serpentine in form with straight connecting portions 28 in between direction changing portions 27, the present invention contemplates the elongated protuberances being made up of widely curved reversed direction portions of sine wave form with the reversed direction portions connected by other portions. However, were the elongated protuberances to be made up of straight portions and sharp angle direction changing portions giving a zigzag configuration, stress would tend to concentrate at the sharp angle points so this configuration is undesirable. It follows that the "change of direction" should be in the nature of a curve.

The principle which is fundamental to the applicants' form of protuberance is that, despite the fact that the body engaging structure 33 can or need not occupy more than one-half the area of the body support area 23, in every case the direction changing portions of the elongated protuberances in the adjacent or side by side protuberances must overlap each other looking in the direction of the length of the elongated protuberances or in other words in the direction of the generally parallel paths the side by side elongated protuberances follow. From this structure follows the advantage that there is no line of weakness in respect to flexure in any direction throughout body support area 23 of seat member 20 or back member 22. This will be made evident by considering the two lines 40, 40 and 42, 42 in FIG. 1 as examples. A plane normal to the plane of body support area 23 containing line 40, 40 or containing any other similar straight line at an angle to the length dimension of the elongated protuberances 26, will pass through a plurality of protuberances 26 and flexure along these lines will be resisted by the traversed portions of the protuberances acting as beams in bending or in torsion. A plane normal to the plane of the body support area containing line 42, 42, although not passing through a plurality of protuberances 26 will, because of the direction changing portions 27 and portions 28 connecting direction changing portions of the protuberance involved, pass a plurality of times through portions 28 connecting the direction changing portions of the protuberance and therefore flexure along line 42, 42 will be resisted by the intercepted portions of the protuberance involved. It will further be evident that any plane normal to the plane of the body support area passing through the body support area which is parallel to the line 42, 42 will either meet the same conditions as the plane containing line 42, 42 in respect to a single protuberance or will intersect the direction changing portions of adjacent protuberances because of the overlapping relationship of the direction changing portions of side by side protuberances.

In addition to the foregoing advantages of the overlapping direction changing portions of the elongated protuberances, is an unexpected advantage which arises from this overlapping direction changing characteristic of the elongated protuberances taken with the structural continuity of the direction changing portions with the portions connecting the direction changing portions and the side by side coaction of the elongated protuberances, namely, an inherent spring action present in the body support area 23. This spring action stems from the various portions of the elongated protuberances interacting with adjacent elongated protuberances and contiguous portions of the same elongated protuberance because of the physical properties and inherent resilience of the sheet of plastic material and the fact that the various portions of the elongated protuberances resist longitudinal bending and as a result resiliently twist longitudinally when flexed slightly, some in the same and some in different directions, the open tops of protuberances 26 spreading in one location and narrowing in another. The theory behind this spring action is difficult to describe but the effect is as though a number of coiled tension springs extending in all directions were present in body support area 23. The overall effect is an enhanced cushioning effect for a supported body.

An advantage of the present invention arising from the nestability or stacking feature of the components is that an extra strong seat can be achieved by utilizing two nested components held in nested relation in any suitable manner, such as by a cover member of fabric encasing them or by spot welding the nested components together. In this manner an extra strength seat cushion or component can be formed which is more flexible than a seat cushion or component formed of heavier gage plastic. In addition, to form components from heavier gage plastic slows down a production line to an uneconomic rate of production.

It will be apparent that additional protuberances, even additional elongated protuberances could be present in the device of the present invention without deleteriously affecting the functions of the complementary shaped protuberances.

A manufactured sample seat member will now be described: The body support area measured 17½" in width and 15¼" in depth. There were eight complete elongated protuberances extending across the entire width of the body support area, each protuberance being ½" wide at the top and about ¼" wide at the bottom with a depth of ½". The width of sheet extending between the open tops of adjacent protuberances varied between 1½" and ¾". Present in this seat member were ½" ventilation holes spaced about 1" apart in the body support surface between protuberances. The direction changing portions changed the direction between portions of each elongated protuberance connecting direction changing portions by about 90° each time. The protuberances were curved in each direction changing portion and the portions joining direction changing portions were straight and measured about 3". Where a back member such as member 22 was involved, the parts were hinged through the medium of an integral hinge formed from the same sheet of plastic material the hinge being about 7" wide and 1¼" long. The plastic material from which the sample was formed was HERCULES No. 7823 polypropylene copolymer and the gage 45 mils. Other plastics can be used and the gage and dimensions of the sample were not critical.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

We claim:

1. A supporting spacing member for use between a supporting surface and a body to be supported comprising
    a sheet of resilient plastic material having an upper surface and a lower surface,
    a body support area provided by the sheet of plastic material,
    a plurality of spaced elongated protuberances permanently formed in the sheet of plastic material throughout the body support area and extending downwardly from the upper surface, the elongated protuberances being open at the top and having side walls and bottom walls, the plurality of elongated protuberances being disposed in spaced adjacent relation to one another and extending longitudinally continuously along paths which extend across an entire dimension of the body support area, portions of the sheet of plastic material which extend between the open tops of spaced adjacent elongated protuberances coacting to form in the aggregate a generally flat body engaging structure, the lowermost surfaces of the bottom walls of protuberances coacting to form in the aggregate a generally flat support structure for engaging the supporting surface, each of the plurality of elongated protuberances incorporating along its longitudinal dimension a plurality of curved direction changing portions and a plurality of portions connecting the curved direction changing portions, successive curved direction changing portions of elongated protuberances alternating in the direction of change along the paths across the body support area, alternate curved direction changing portions of spaced adjacent elongated protuberances along the paths across the body support area being in overlapping relation to each other looking in the direction the paths extend, the disposition of elongated protuberances in paths across an entire dimension of the body support area and the overlapping relationship of the alternate curved direction changing portions resulting in a body support area in which all planes normal to the generally flat body engaging structure will successively intersect a plurality of elongated protuberances at a plurality of spaced points across an entire dimension of the body support area or will repeatedly intersect alternately disposed portions connecting curved direction changing portions of a single elongated protuberance at a plurality of spaced points across an entire dimension of the body support area.

2. The device of claim 1 wherein
adjacent sidewalls of spaced adjacent elongated protuberances are complementary in shape along the length dimension of the elongated protuberances.

3. The device of claim 1 wherein
marginal portions on the sheet of plastic material circumscribe the body support area, and
elongated protuberances extend uninterrupted from marginal portion to marginal portion.

4. The device of claim 1 wherein
a plurality of the elongated protuberances all have the same shape and each elongated protuberance is spaced from adjacent elongated protuberances the same distance and spaced adjacent elongated protuberances are spaced from each other the same distance throughout their lengths.

5. The device of claim 1 wherein
there are openings through the sheet of plastic material in the body engaging structure disposed throughout the body engaging structure.

6. The device of claim 1 wherein
the portions of the elongated protuberances connected to the direction changing portions are straight.

7. The device of claim 1 wherein
the paths of the elongated protuberances across a dimension of the body support area are generally parallel.

8. The device of claim 1 wherein
the spacing between spaced adjacent protuberances is such that the body engaging structure occupies more than one-half the area of the body support area.

9. The device of claim 1 wherein
the physical properties of the sheet of plastic material are such that the plurality of elongated protuberances resist extreme and permanent deformation of the body support area under the weight of the body of a human while resiliently deforming sufficiently to cushion the body.

10. The device of claim 1 wherein
the physical properties of the sheet of plastic material are such that the plurality of elongated protuberances resist extreme and permanent deformation of the body support area under the weight and impact forces of industrial pallet loads.

11. The device of claim 1 wherein
the sheet of plastic material provides a second body support area and an integral connection between the two body support areas acts as a hinge therebetween whereby one body support area can form a seat cushion portion and the other body support area can form a back cushion portion.

12. The device of claim 11 wherein
the integral hinge connection between the two body support areas has a width dimension not appreciably greater than one half the width of the body support areas.

13. The device of claim 1 wherein
the sidewalls of the portions connecting the direction changing portions are tortuous in configuration along the length dimension of the portions connecting the direction changing portions.

14. The device of claim 1 wherein
a marginal portion of the sheet of plastic material circumscribes the body support area,
a textile cover material is disposed over the body support area in contact with the body engaging structure, and
fastening means connect the textile cover material to the marginal portion.

15. The device of claim 1 wherein
a second sheet of plastic material is disposed in contact with the lowermost surfaces of the bottom walls of a plurality of elongated protuberances, and
means act between lowermost surfaces of the bottom walls of elongated protuberances and the second sheet of plastic material to hold the second sheet in bracing relation to the elongated protuberances.

16. The device of claim 1 including
a second sheet of plastic material having a lower surface and an upper surface and having a plurality of elongated protuberances permanently formed in the sheet and extending upwardly from the lower surface, the elongated protuberances having side and top walls, the uppermost surfaces of the top walls being in contact with the lowermost surfaces of the bottom walls of a plurality of the elongated protuberances of the first claimed sheet of plastic material, and
means acting between the lowermost surfaces of the bottom walls of elongated protuberances of the first claimed sheet of plastic material and the uppermost surfaces of the top walls of elongated protuberances of the second sheet where they are in contact to hold the second sheet in bracing relation to the first claimed sheet.

17. The device of claim 15 wherein
the second sheet is shaped the same as the first claimed sheet and elongated protuberances in the two sheets coincide along their lengths.

18. The device of claim 15 wherein
the second sheet is shaped the same as the first claimed sheet and elongated protuberances in the two sheets are in reversed relation so that the uppermost surfaces of the top walls of elongated protuberances in the second sheet and the lowermost surfaces of bottom walls of elongated protuberances in the first claimed sheet are in contact with each other at spaced points where they cross.

19. The device of claim 1 wherein
alternate elongated protuberances are dissimilar in configuration but have complementary shaped adjacent sidewalls.

20. The device of claim 19 wherein
each elongated protuberance is symmetrical in configuration in respect to its longitudinal axis.

* * * * *